(No Model.)
E. A. C. PETERSEN.
BAKER'S OVEN.
No. 512,623. Patented Jan. 9, 1894.
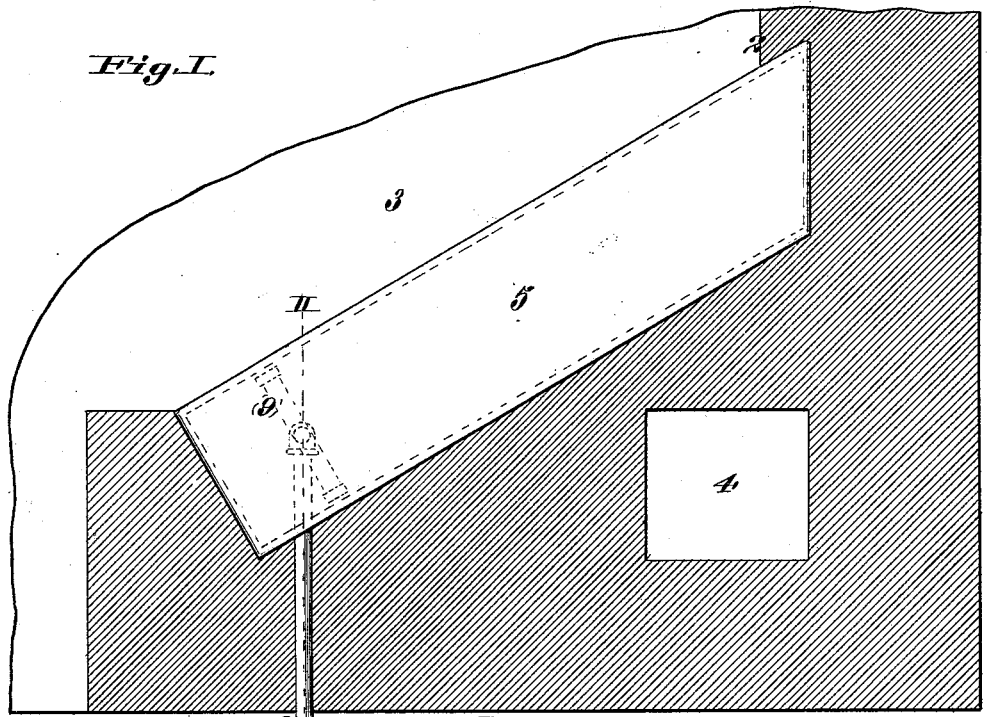
Fig. I.
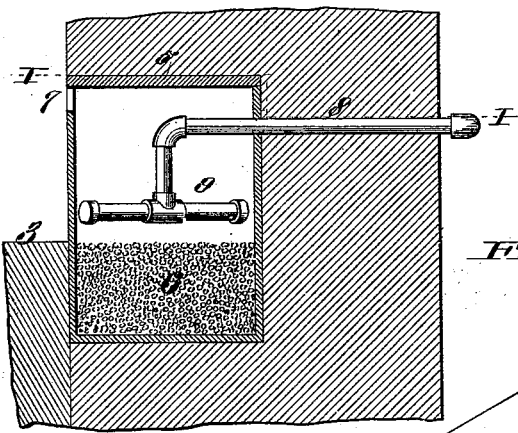
Fig. II.
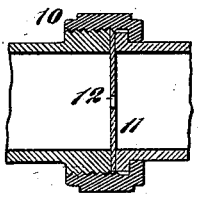
Fig. III.
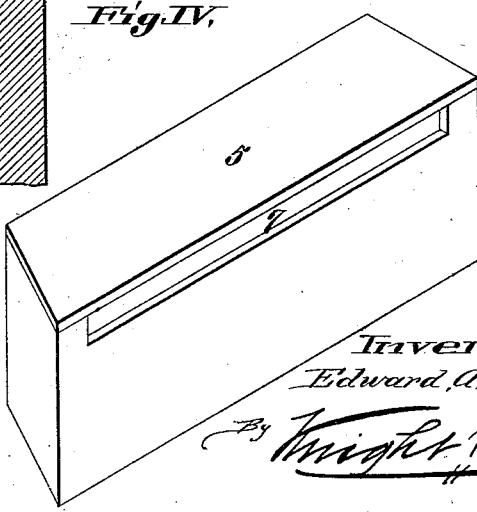
Fig. IV.
Attest:
A. M. Ebersole
E. Knight
Inventor:
Edward A. C. Petersen
By Knight Bros
Atty's
THE NATIONAL LITHOGRAPHING COMPANY,
WASHINGTON, D. C.

UNITED STATES PATENT OFFICE.

EDWARD A. C. PETERSEN, OF CHICAGO, ILLINOIS.

BAKER'S OVEN.

SPECIFICATION forming part of Letters Patent No. 512,623, dated January 9, 1894.

Application filed May 29, 1893. Serial No. 475,869. (No model.)

*To all whom it may concern:*

Be it known that I, EDWARD A. C. PETERSEN, of Chicago, in the county of Cook and State of Illinois, have invented a certain new and useful Improvement in Bakers' Ovens, of which the following is a full, clear, and exact description, reference being had to the accompanying drawings, forming part of this specification.

My present invention relates to a device for creating steam in the baking chamber of the oven; and my invention consists in features of novelty hereinafter fully described and pointed out in the claim.

Figure I is a detail, horizontal section through the walls of a baker's oven, at one corner of the baking or bread chamber, and illustrative of my invention. Fig. II is a detail, vertical section of the walls of the oven, showing the vaporizing box in transverse section. Fig. III is an enlarged, longitudinal section of the water pipe at the union. Fig. IV is a perspective view of the vaporizing box.

Referring to the drawings, 1 represents the front wall, and 2 one of the side walls of a baker's oven.

3 is the baking or bread chamber.

4 is one of the flues through which the heat and products of combustion pass, and which is located in the wall of the oven.

5 is a box, located, preferably, in one corner of the baking chamber, and preferably set into the wall of the oven, as shown in Fig. I, in close proximity to the flue 4. This box is preferably partly filled with gravel, as shown at 6, Fig. II, and the baking chamber side of the box is provided with an opening 7, near the top, as shown in Figs. II and IV.

8 is a water pipe communicating with the box 5, and having a spray 9 on its inner end, within the box. This pipe has a union 10 in which is placed a diaphragm 11, with a small opening 12. (See Fig. III.)

The operation is as follows: When a fire is built in the oven, the box 5 becomes heated, owing to its close proximity to the flue 4, and the gravel 6 becomes quite hot. Water is then turned on through the pipe 10, and is allowed to pass very slowly through the diaphragm 12. It escapes through the spray 9, and falling upon the hot gravel, is vaporized, and the steam issues through the opening 7 into the baking or bread chamber, to effect the well-known desirable results.

By the use of the diaphragm 11, with its small opening, just the required amount of water will pass slowly into the vaporizing box, and if, at any time, more or less water is desired, a diaphragm with a smaller or larger opening may be inserted.

The device is an effective one, and outside of the small original cost, there is no expense accompanying its use.

I claim as my invention—

The combination, with a baker's oven having a baking chamber 3 and a flue 4; of the vaporizing box 5 having an opening 7, and located in one corner of the baking-chamber in close proximity to the flue, and a water pipe having a perforated diaphragm 11 and a spray 9; substantially as described.

EDWARD A. C. PETERSEN.

In presence of—
   A. M. EBERSOLE,
   BENJN. A. KNIGHT.